US009235922B2

(12) United States Patent
Alj et al.

(10) Patent No.: US 9,235,922 B2
(45) Date of Patent: Jan. 12, 2016

(54) METHOD FOR MODELLING A 3D SCENE AND CORRESPONDING DEVICE

(71) Applicant: THOMSON LICENSING, Issy de Moulineaux (FR)

(72) Inventors: Youssef Alj, Rennes (FR); Guillaume Boisson, Pleumeleuc (FR); Philippe Bordes, Laille (FR); Luce Morin, Rennes (FR); Muriel Pressigout, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 396 days.

(21) Appl. No.: 13/716,062

(22) Filed: Dec. 14, 2012

(65) Prior Publication Data

US 2013/0187918 A1    Jul. 25, 2013

(30) Foreign Application Priority Data

Dec. 16, 2011 (FR) ..................................... 11 61788

(51) Int. Cl.
*G06T 15/08* (2011.01)
*G06T 17/10* (2006.01)

(52) U.S. Cl.
CPC .................. *G06T 15/08* (2013.01); *G06T 17/10* (2013.01)

(58) Field of Classification Search
CPC .................. A61B 1/00193; H04N 2013/0081; H04N 13/0011; H04N 13/0282; H04N 19/00769; H04N 13/0018; G06T 7/0065; G06T 7/0075; G06T 2207/10012; G06T 15/205; G06T 2207/20228; G06T 15/00; G06T 2207/10028; G06T 2207/1001; G06T 15/08

See application file for complete search history.

(56) References Cited

U.S. PATENT DOCUMENTS 6,952,204 B2    10/2005  Baumberg et al.
6,990,228 B1    1/2006   Wiles et al.
2011/0221861 A1*  9/2011  Jeon et al. ........................ 348/42

OTHER PUBLICATIONS

Publication Date: 2008 | Dec. 8-11, 2008 Document Title: Enforcing Image Consistency in Multiple 3-D Object ModellingAuthors: Grum, M. Bors, A.G.Organization: Dept. of Comput. Sci., Univ. of York, YorkSource: ICPR 2008 19th International Conference on Pattern RecognitionPublisher: IEEE.

(Continued)

*Primary Examiner* — Haixia Du
(74) *Attorney, Agent, or Firm* — Tutunjian & Bitetto, P.C.

(57) ABSTRACT

The invention relates to a method for modeling a scene from a plurality of maps representative of depth, each map representative of depth being associated with a view of the said scene according to a particular viewpoint, To optimize the fidelity and precision of the scene modeling, the method comprises the following steps:
 generating, for each map representative of depth, a surface representative of the said depth map in world space;
 estimating a volume bounding all surfaces generated, the said bounding volume being discretised into a plurality of voxels;
 associating attributes representative of transparency with the said voxels of the bounding volume; and
 generating a resulting surface according to the attributes representative of transparency associated with the said voxels.

The invention also relates to a device for processing the data representative of the corresponding depth.

23 Claims, 8 Drawing Sheets

(56) References Cited

OTHER PUBLICATIONS

Publication Date: 2008 | Jan. 22-25, 2008Document Title: Exact Visual Hull From Marching CubesAuthors: Chen Liang Wong, K.-Y. K.Department of Computer Science, The University of Hong Kong, Pokfulam, Hong Kongcliang@cs.hku.kh, kykwong@cs.hku.hkOrganization: Dept. of Comput. Sci., Univ. of Hong Kong, Hong KongSource: VISAPP 2008. Proceedings of the Third International Conference on Computer Vision Theory and ApplicationsPublisher: INSTICC—Institute for Systems and Technologies of Information, Control, and.
Projective Visual HullsPublication Date: Aug. 2007Authors:Svetlana Lazebnik1 (slazebni@uiuc.edu)Yasutaka Furukawa1 (yfurukaw@uiuc.edu)Jean Ponce1,2 (jponce@uiuc.edu)1 Department of Computer Science and Beckman InstituteUniversity of Illinois, Urbana, IL 61801, USA2 Départment d'InformatiqueEcole Normale Sup'erieure, Paris, France.
System for Reconstruction of Three-Dimensional Micro Objects From Multiple Photographic Imagesauthors: Atsushi, K. Sueyasu, H. Funayama, Y. Maekawa, T.Organization: Dept. of Mech. Eng., Yokohama Nat. Univ., Yokohama | Ricoh Co. Ltd. Technol. Center, 2011.
Aggraval et al—Volumetric descriptions of objects from mulitple views—IEEE Transactions on Pattern Analysis and Machine Intelligence 5(2)-150 158—Mar. 1983.
Edelsbrunner et al—Three-dimensional alpha shapes In Workshopon Volume Visualization pp. 75-105 Oct. 1992.
Kaazdhan et al_Poisson surface reconstruction—In Proc SGP pp. 67-70-2006.
Kutulakos et al—A theory of shape by space carving. International Journal of Computer Vision 38(3) 199-218-2000.
Hyojin Kim et al. "GPU Based Scalable Volumetric Recosntruction for Multi View Stereo" IVCNS 2011 (Nov. 29, 2011).
Grosso Etal "3D Object Reconstruction Using Stereo and Motion" IEEE Transactions on Systems, Man and Cybernetics, IEEC Inc, New York, US, vol. 19, N° 6, Nov. 1, 1989, pp. 1465-1476.
Alj Y et al. "Space Carving MVD Sequences for Modeling Natural 3D Scenes" SPIE Proceedings: Three Dimensional Image Processing (3DIP) and Application II, The International Society for Opitical Engineering—SPI, Bellingham, 2012.
Search Report Dated Sep. 21, 2012.

\* cited by examiner

METHOD FOR MODELLING A 3D SCENE AND CORRESPONDING DEVICE

This application claims the benefit, under 35 U.S.C. §119 of French Patent Application 1161788, filed Dec. 16, 2011.

1. DOMAIN OF THE INVENTION

The invention relates to the domain of image or video processing and more specifically to data processing representative of depth; for example depth maps or disparity maps associated with images of a video stream. The invention also relates to the domain of modelling of the geometry of a real scene using the depth data associated with images representative of the scene from several viewpoints.

2. PRIOR ART

According to the prior art, several methods of modelling a real scene in three dimensions (3D) are known. Among these methods, the technique called "Visual Hull" is used to reconstruct a 3D real scene from images of the scene captured by a set of cameras from several viewpoints. A silhouette of the scene is calculated for each image. A volumetric intersection of the de-projections of these silhouettes in world space enables a 3D model of the captured scene to be reconstructed. One disadvantage of this method is that it induces modelling errors of concave areas (see for example the document entitled "*Volumetric descriptions of objects from multiple views*" by W. N. Martin and J. K. Aggarwal published in *IEEE Transactions on Pattern Analysis and Machine Intelligence*, 5(2):150-158, March 1983).

Another technique called "Space carving" is used to model a real scene captured by multiple cameras from several viewpoints. According to this method, a volume bounding the objects in the captured scene is defined then discretised into a plurality of voxels. The photo-consistency of each voxel of the bounding volume is then defined by projecting each voxel onto the image planes associated with the cameras having captured the scene images, a voxel being photo-consistent if its projection is identical (that is to say that the variation of the colour associated with the projections of the voxel is less than a threshold value) on each image plane. To reconstruct a 3D model of the scene, the voxels which are not photo-consistent are eliminated (see the document entitled "*A theory of shape by space carving*" by K. N. Kutulakos and S. M Seitz published in *International Journal of Computer Vision*, 38 (3), 199-219 (2000)). The method known as "Space carving" presents several disadvantages. One of the disadvantages arises from the use of a threshold value to determine the photo-consistency of voxels, photo-consistency estimation errors being induced by an inappropriate threshold value. Another problem emerges when the captured scene comprises surfaces with significant light variations. Such areas, over-lighted or having significant light variations, induce erroneous photo-consistency determinations and therefore the elimination of incorrect voxels.

3. SUMMARY OF THE INVENTION

The purpose of the invention is to overcome at least one of these disadvantages of the prior art.

More specifically, the purpose of the invention is notably to optimise the scene modelling fidelity and accuracy.

The invention relates to a method of modelling a scene from a plurality of maps representative of depth, each map representative of depth being associated with a view of the scene according to a particular viewpoint. The method comprises the following steps:

generating, for each map representative of depth of the plurality of maps, a surface representative of the map representative of depth in world space;

estimating a volume bounding the surfaces generated in world space, the bounding volume being discretized into a plurality of voxels, an attribute representative of transparency being associated with the voxels of the bounding volume;

generating, for each surface, a plurality of rays originating from a viewpoint associated with the generated surface and having as end point the intersection with the generated surface;

running through the plurality of generated rays, the value of the attribute representative of transparency being changed for the voxels of the bounding volume having an intersection with one of the generated rays; and generating data representative of a resulting surface according to the attributes representative of transparency associated with the voxels.

Advantageously, the method comprises, for each surface generated and representative of a depth map associated with a viewpoint, an association of the voxels of the bounding volume with the generated surface to define the generated surface in accordance with a criterion of proximity of the voxels relative to the generated surface;

According to a particular characteristic, an attribute representative of transparency comprises two states, a first state corresponding to a transparent state of the voxel associated with the attribute, a second state corresponding to an opaque state of the voxel associated with the attribute, a voxel being in the transparent state when it has an intersection with one ray of the plurality of rays.

Advantageously, an attribute representative of transparency is determined according of the position of the voxel associated with the attribute with respect to a viewpoint and to the surface representative of a depth map associated with the viewpoint.

According to a specific characteristic, the attribute comprises two states, a first state corresponding to a transparent state of the voxel associated with the attribute, a second state corresponding to an opaque state of the voxel associated with the attribute, a voxel being in the transparent state when it is positioned between a viewpoint and the surface representative of the depth map associated with the viewpoint in the world space.

Advantageously, the position of the voxel is determined by estimating the intersection between the voxel and a ray launched from the viewpoint.

According to a particular characteristic, the surface representative of the depth map in the world space is generated using parameters representative of calibration associated with at least one camera used to capture the views of the scene associated with the plurality of depth maps.

According to another characteristic, the plurality of depth maps is obtained from a multi-view video stream.

Advantageously, the video stream is an MVD stream "Multiview Video plus Depth".

According to a specific characteristic, the method comprises a step of transmitting depth information representative of the resulting surface.

The invention also relates to a device for processing data representative of a plurality of maps representative of depth, each map representative of depth being associated with a view of a scene according to a particular viewpoint, the device comprising at least a processor configured for:

generating, for each map representative of depth of the plurality of maps, a surface representative of the map representative of depth in world space;

estimating a volume bounding the surfaces generated in world space, the bounding volume being discretised into a plurality of voxels, an attribute representative of transparency being associated with the voxels of the bounding volume;

generating, for each surface, a plurality of rays originating from a viewpoint associated with the generated surface and having as end point the intersection with the generated surface;

running through the plurality of generated rays, the value of the attribute representative of transparency being changed for the voxels of the bounding volume having an intersection with one of the generated rays; and generating data representative of a resulting surface according to the attributes representative of transparency associated with the voxels.

4. LIST OF FIGURES

The invention will be better understood, and other specific features and advantages will emerge upon reading the following description, the description making reference to the annexed drawings wherein.

Figure 1:
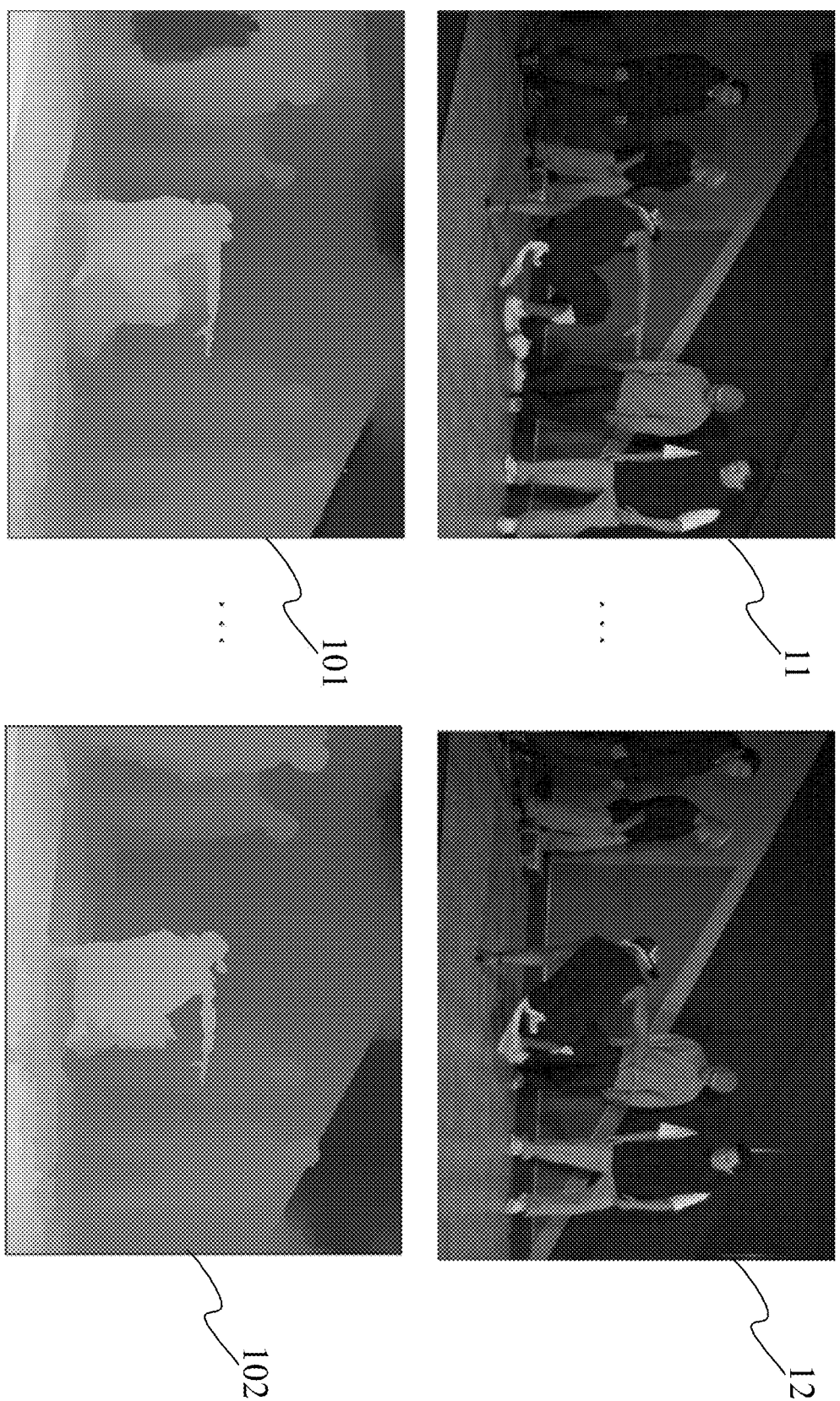
FIG. 1 illustrates a plurality of images representative of a scene and depth maps associated with this plurality of images, according to an example of a particular implementation of the invention.
Figure 3:
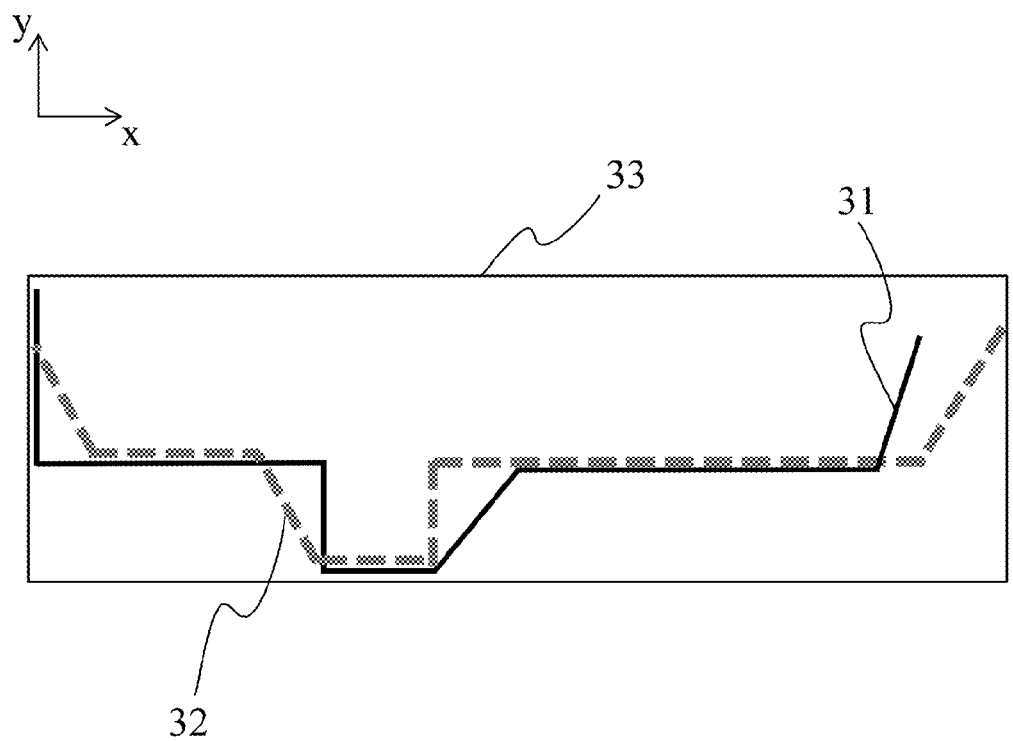
FIG. 3 illustrates a volume bounding a plurality of surfaces representative of the depth maps in FIG. 1, according to a particular embodiment of the invention.
Figure 9:
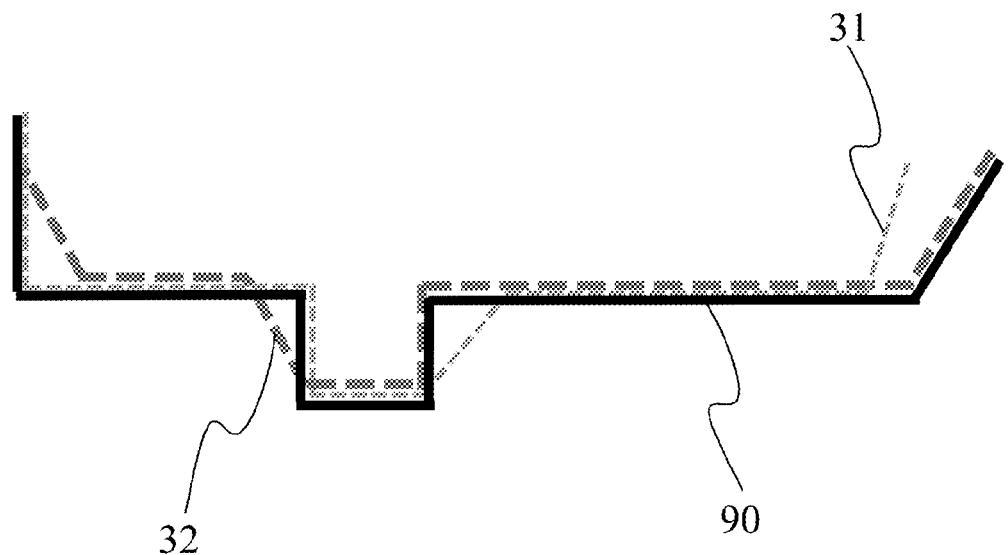
Figure 4:
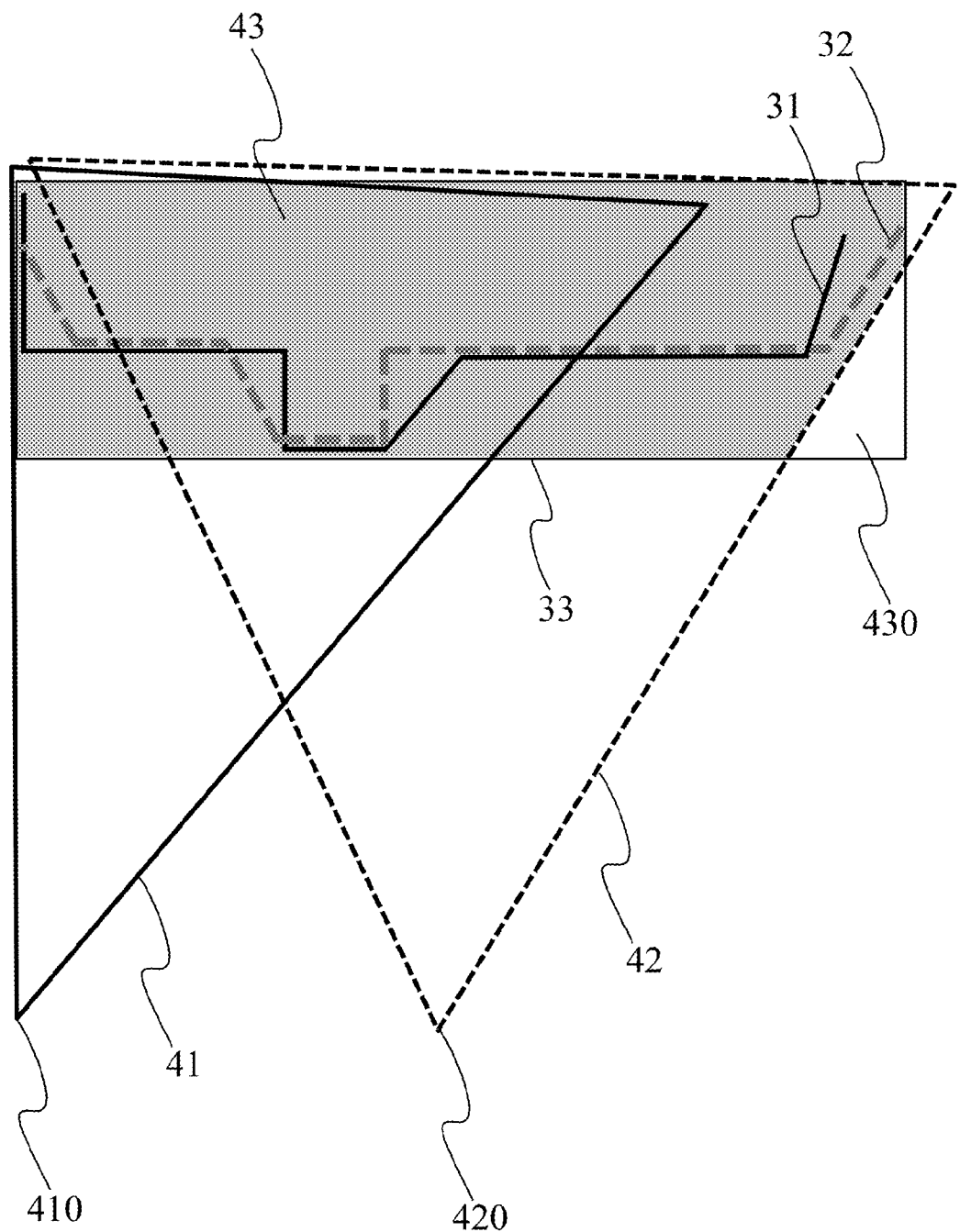
FIGS. 4, 5 and 6 illustrate steps of the method for modelling the scene represented by the plurality of images in FIG. 1, according to a particular embodiment of the invention.
Figure 5:
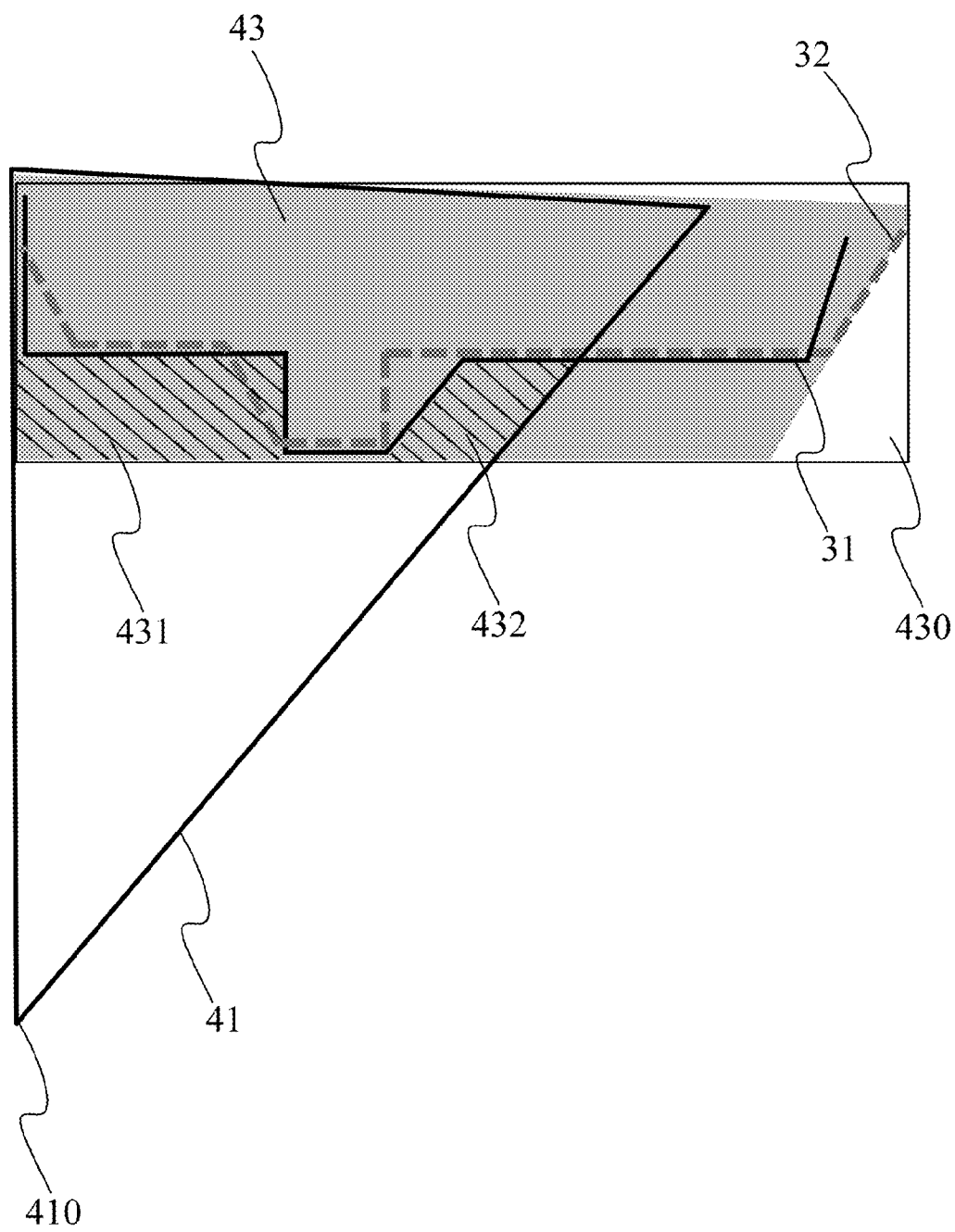
Figure 6:
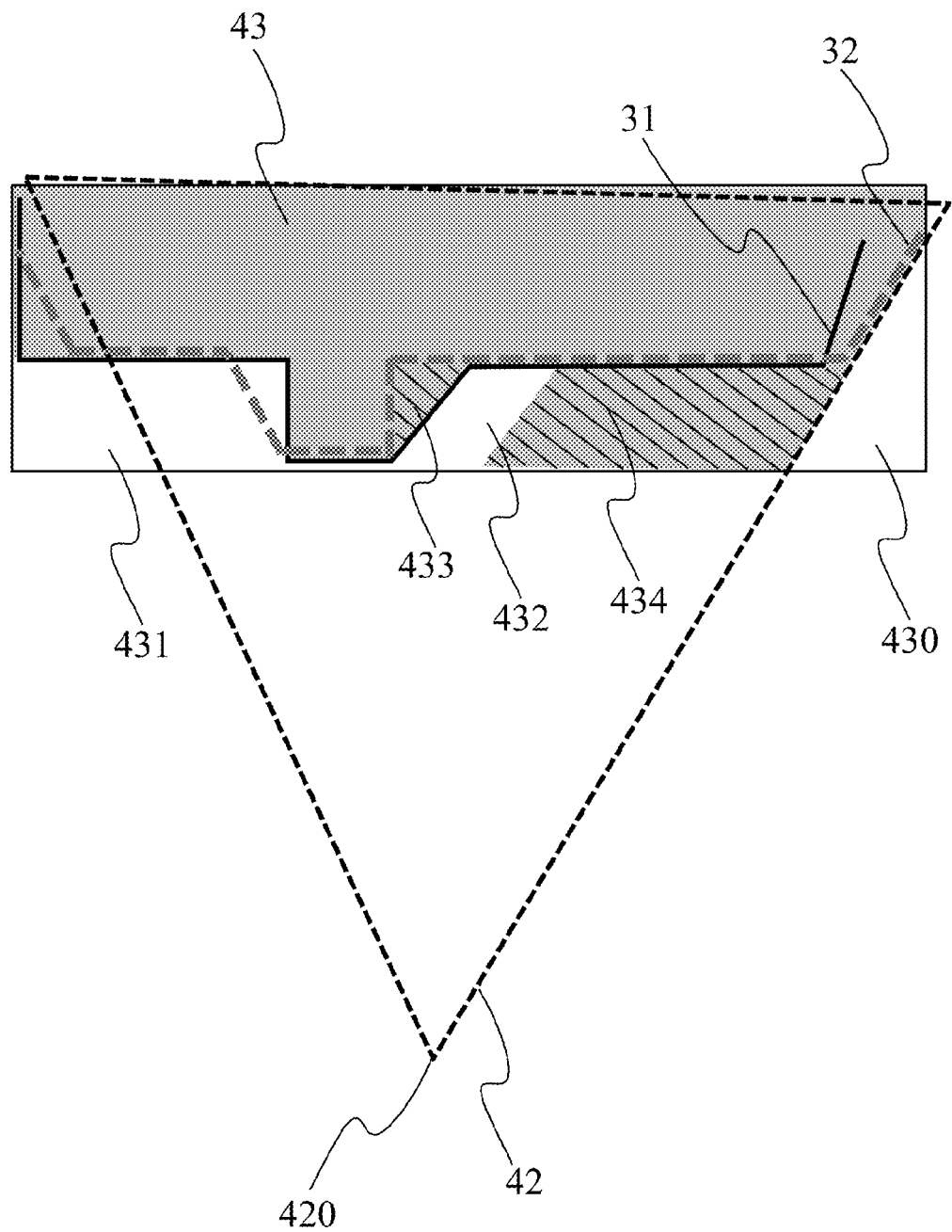
Figure 7:
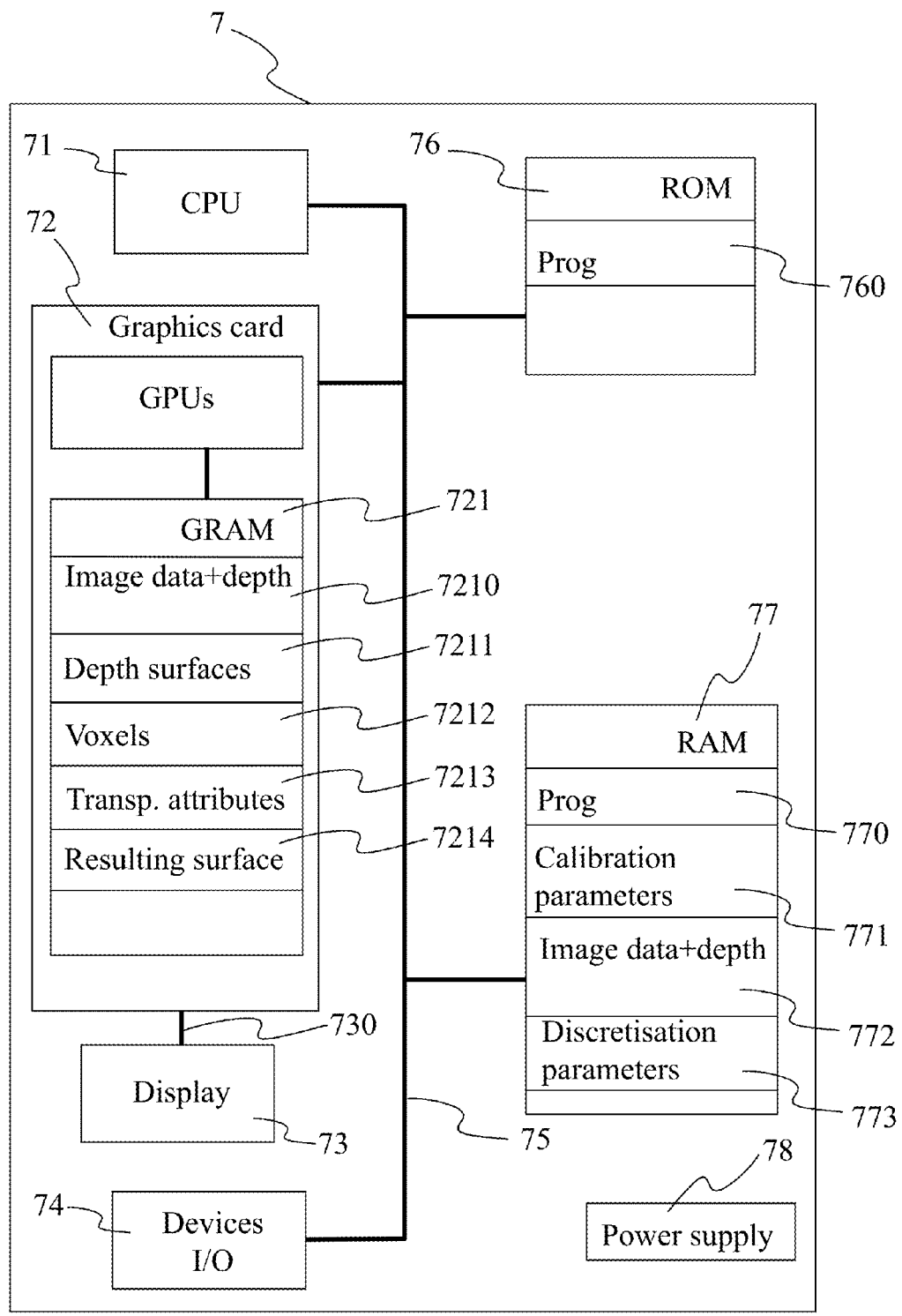
Figure 8:
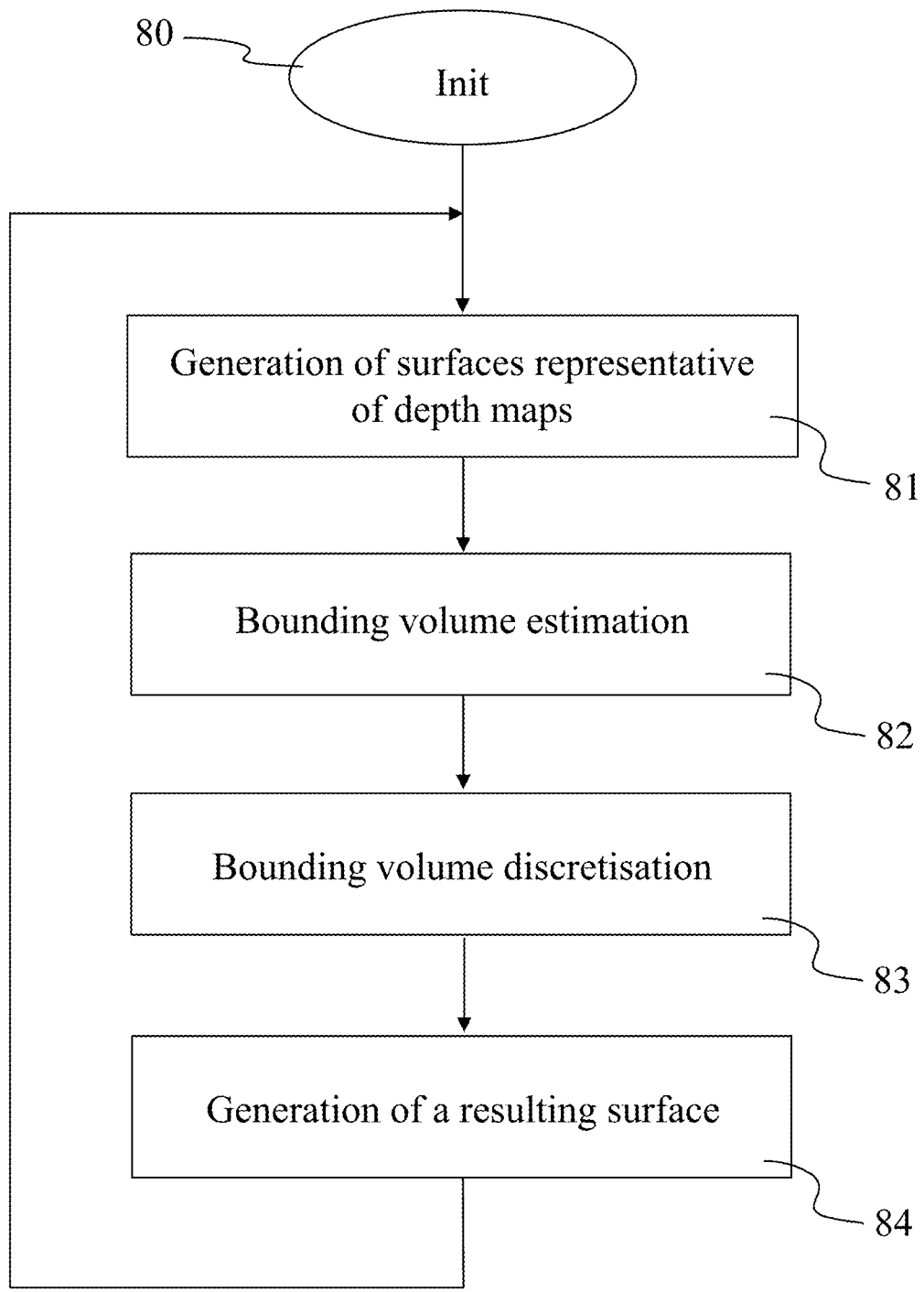

FIG. 7 diagrammatically shows the structure of a unit for processing data representative of the depth maps in FIG. 1, according to a particular embodiment of the invention;

FIG. 8 illustrates a method for modelling a scene from the depth maps in FIG. 1, implemented on a processing unit in FIG. 7, according to a particular embodiment of the invention;

FIG. 9 illustrates a surface resulting from the processing performed on the surfaces of the bounding volume in FIG. 3 according to the steps of the method shown in FIGS. 4, 5 and 6, according to a particular embodiment of the invention.

5. DETAILED DESCRIPTION OF THE EMBODIMENTS OF THE INVENTION

The invention will be described with reference to a first particular embodiment of a method for modelling a scene. The scene is advantageously represented according to several viewpoints in several images, each image being associated with information representative of depths. Information on depths is stored for example in depth maps or disparity maps. A particular viewpoint is associated with each map comprising depth information associated with the image captured according to the viewpoint considered. For each map comprising information representative of depth, a surface is generated in world space (that is to say in the space of the scene), the surface consequently representing the map comprising information representative of depth in world space according to the viewpoint associated with the map considered. A bounding volume is defined, which comprises all the generated and representative surfaces of maps comprising information representative of depth according to the different viewpoints. The bounding volume is then discretised, that is to say divided into a plurality of voxels, an attribute representative of transparency being associated with each voxel. A surface resulting from the fusion of all previously generated surfaces is then determined from the attributes representative of transparency associated with the voxels of the bounding volume.

Taking into account a geometric criterion (that is to say depth information) to determine a surface resulting from the fusion of several surfaces representing the depth information associated with the scene to be modelled according to several viewpoints has the advantage of overcoming the problems generated by taking into account a photometric criterion (that is to say the colour information associated with pixels of images representing the scene according to different viewpoints), while ensuring high fidelity in the modelling of the scene taking into consideration the concave and convex parts of the scene.

FIG. 1 illustrates a plurality of images 11, 12 representative of a scene and the maps representative of depth 101, 102 associated with each of the images 11, 12, according to an example of a particular and non-restrictive implementation of the invention. Images 11 and 12 represent the same scene from two different viewpoints. The video content of image 12 corresponds to the video content of image 11 shifted according to a horizontal axis towards the right. The scene represented in images 11 and 12 is advantageously captured by two acquisition devices, for example two cameras spatially offset in relation to one another. Each image 11, 12 is associated with data representative of depth, for example a depth map (e.g. "z-buffer" type) or a disparity map. For the rest of the description we will make no distinction between a map representative of depth and a depth map, it being understood that it can concern any data structure representative of depth or disparity information. According to the example illustrated with respect to FIG. 1, a depth map 101 is associated with image 11 and a depth map 102 is associated with image 12. The depth map 101 (respectively 102) represents in gray levels the depth associated with each pixel of the image 11 (respectively 12), the closest pixels of the image (that is to say having the lowest depth values, the reference being the viewpoint of the image or the acquisition device having being used to capture the image) being the brightest and the most distant pixels of the image (that is to say having the highest depth values) being the darkest. Advantageously, the depth information associated with the pixels of images 11 and 12 are captured by means of suitable sensors, for example by means of infra-red sensors associated with an infrared transmitter (Kinect® type system) or by means of a system comprising a laser transmitter and an associated sensor to set the travel time of a laser ray emitted to the scene captured and reflected by the same scene, the travel time being representative of the distance travelled and therefore the depth associated with the scene point which reflected the laser ray.

According to a variant, a disparity map is associated with each image 11, 12. According to this variant, the disparity map associated with the image 11 is representative of the disparity between image 11 and image 12 and the disparity map associated with image 12 is representative of the disparity between image 12 and image 11. Each disparity map is advantageously estimated by comparison and pairing of the pixels of image 11 (respectively 12) to the pixels of image 12 (respectively 11). The disparity associated with a pixel of an image 11 (respectively 12) advantageously corresponds to the pixel distance between this pixel of image 11 (respectively 12) and the corresponding (or paired) pixel of image 12 (respectively 11), that is to say, the pixel of the image 12 (respectively 11) having video information (that is to say, colour information) identical or similar to that of the pixel of image 11 (respectively 12).

According to another variant, the depth map 101, 102 associated with each image 11, 12 is deduced from the disparity map associated with each image 11, 12.

The images 11 and 12 belong to a multi-view video stream comprising a sequence of several images representative of the same scene. Advantageously, the multi-view video stream is of MVD type (Multiview Video plus Depth).

According to a variant, the colour and depth information associated with pixels of images 11 and 12 are stored in memories in the form of RGBa information, the RGB channels (Red, Green, Blue) being used to store the colour information associated with each pixel (e.g. 8, 10 or 12 bits per channel) and the channel a being used to store the depth (or disparity) information, for example on 8, 10 or 12 bits.

Advantageously, the intrinsic and extrinsic parameters of the acquisition devices used to acquire the plurality of images are known and for example stored in a memory. The intrinsic and extrinsic parameters correspond to the calibration parameters of acquisition devices. The intrinsic parameters comprise for example the focal length, magnification factors of the image, the projection coordinates of the optical centre of the acquisition device on the image plane and/or a parameter translating the potential non-orthogonality of lines and columns of photosensitive cells which compose the sensor of the acquisition device. The extrinsic parameters comprise for example the rotation matrix used to shift from the world space reference to the image space reference (and vice versa) and/or the components of the translation vector used to move from the world space reference to the image space reference (and vice versa).

Naturally, the number of images representative of a scene is not limited to 2 images but extends to any number greater than 2, e.g. 3, 4, 5, 10, 20, 50, 100 images, data representative of depth being associated with each image. Advantageously, each frame is captured by a particular acquisition device according to a particular viewpoint, the acquisition devices being spatially offset in relation to one another. According to a variant, only one pair of left and right images is captured using two acquisition devices, the other images of the plurality representative of the captured scene being calculated from the pair of left and right images by disparity-compensated interpolation. According to this variant, each image is also representative of the same scene according to a particular viewpoint and data representative of depth (for example a depth map or disparity map) is associated with each image, whether captured or interpolated.

Figure 2:
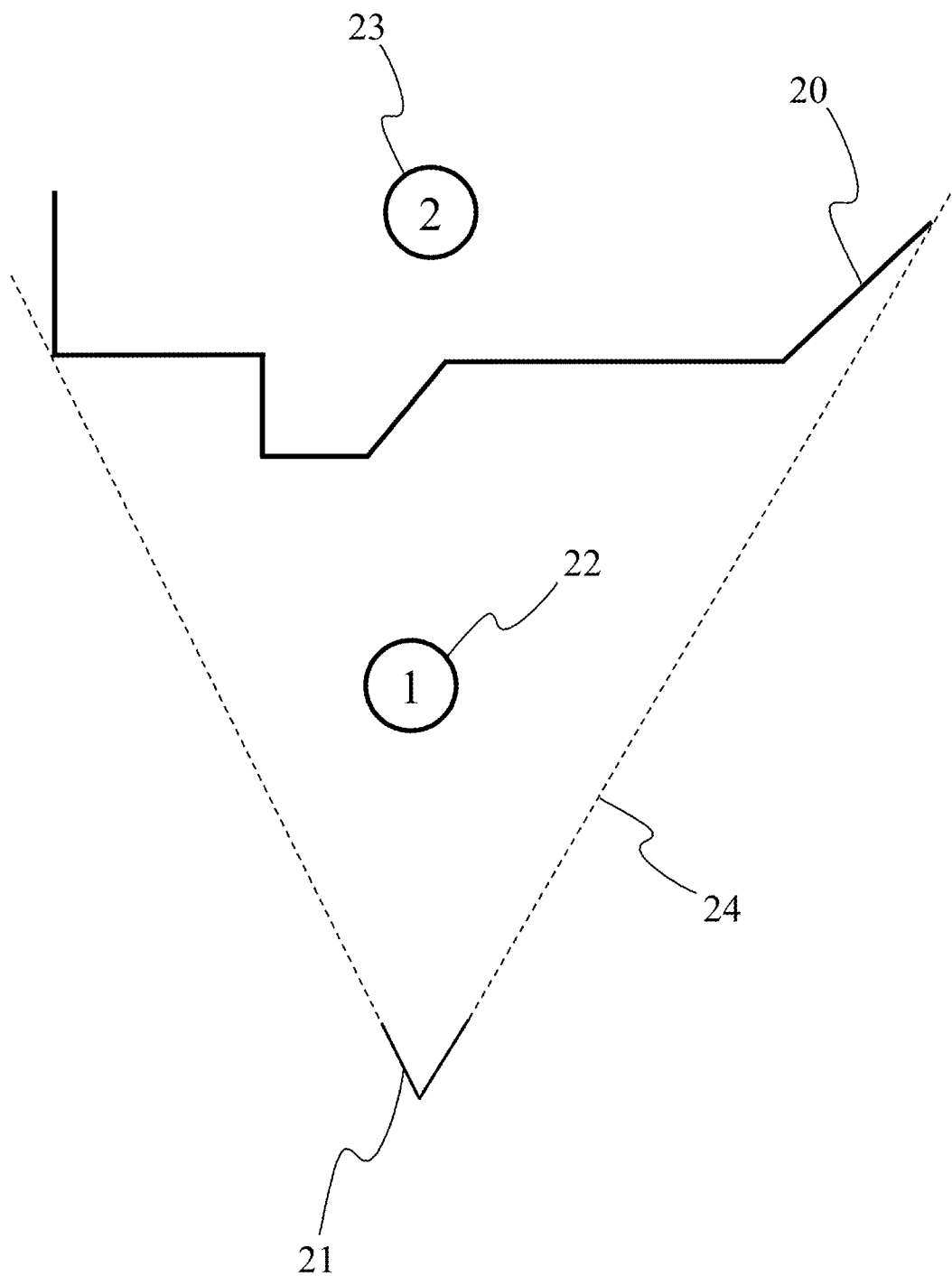
FIG. 2 illustrates a surface representative of a depth map in FIG. 1, according to a particular embodiment of the invention.

FIG. 2 illustrates a surface 20 representative of a depth map 101, 102, according to a particular and non-restrictive embodiment of the invention. For obvious practical reasons, the surface 20 illustrated is a 2D representation of the surface representative of a depth map of an image, for example a sectional top view of the surface. The surface 20 also represents the surface of the visible points or elements of an image as viewed from a viewpoint 21. We refer to points when the image is represented by a plurality of points (or pixels). We refer to elements when the image is represented by elements, for example the elements of a mesh (e.g. triangles or parallelepipeds). According to a variant, an element corresponds to a voxel and the surface is thus defined by the limit (or one face) of adjacent voxels.

The area (1) 22 delimited on the one hand by the view cone having for its vertex the viewpoint 21 and on the other hand the surface 20 corresponds to the geometric inconsistency area, that is to say the area comprising the geometrically inconsistent points (or voxels). By geometrically inconsistent points/voxels is understood the set of points or voxels that do not belong to an object of the 3D-modelled scene (the scene being represented in one of the images 11, 12). Such a point or voxel not belonging to an object of the scene is also called transparent. A point/voxel is called geometrically incoherent if the distance which separates it from the viewpoint 21 according to a ray originating from the viewpoint and passing through the point/voxel in question is less than the distance from the viewpoint 21 of the point of the surface 20 encountered by the ray passing through the point/voxel in question. According to a variant, any point/voxel belonging to a ray originating from the viewpoint 21 and having as an end point a point of the surface 20, is called geometrically inconsistent.

The area (2) 23 comprises all points/voxels placed behind the surface 20, if we are positioned at the viewpoint 21, corresponds to an area of geometrical consistency, that is to say an area comprising the geometrically consistent points/voxels. By geometrically consistent points/voxels is understood the set of points or voxels belonging to an object in the 3D-modelled scene (the scene being represented in one of the images 11, 12). Such a point or voxel not belonging to an object of the scene is also called opaque. A point/voxel is called geometrically consistent if the distance which separates it from the viewpoint 21, according to a ray originating from the viewpoint and passing through the point/voxel in question, is greater than the distance separating the viewpoint 21 from the point of the surface 20 encountered by the ray passing through the point/voxel in question. According to a variant, any point/voxel not belonging to a ray originating from the viewpoint 21 and having as an end point a point on the surface 20 is called geometrically consistent.

FIG. 3 illustrates a volume 33 bounding a plurality of surfaces 31, 32 representative of the depth maps 101, 102, according to a particular and non-restrictive embodiment of the invention. The surface 31 shown in solid line is for example representative of the depth map 101 according to the viewpoint associated with the image 11, the depth map 101 itself being associated with the image 11. The surface 31 thus represents the set of points or elements of the scene represented by image 11 visible from the viewpoint associated with image 11. The surface 32 shown in dotted line is for example representative of the depth map 102 according to the viewpoint associated with image 12, the depth map 102 itself being associated with image 12. The surface 32 thus represents the set of points or elements of the scene represented by image 12 visible from the viewpoint associated with image 12. The surfaces 31 and 32 are two-dimensional representations of three-dimensional surfaces. The illustration in FIG. 3 of these surfaces 31 and 32 corresponds for example to a sectional top-view of 3D surfaces. The volume 33 (called bounding volume in the following description) is defined so that it fully comprises the surfaces 31 and 32, the limits of the bounding volume being determined by points positioned at the end points of the surfaces 31 and 32, that is to say the points of the surfaces 31 or 32 having the most extreme x, y and z coordinates (the lowest and highest values for each axis x, y and z). Once defined, the bounding volume 33 is discretised into a plurality of voxels, the voxels being advantageously all of the same dimensions (a voxel corresponds for example to a cube or a rectangular parallelepiped). The discretisation parameters (such as the number of voxels per volume unit or the dimensions of a voxel in x, y and z) are advantageously predefined. According to a variant, the discretisation parameters are adjustable by a user, for example via a user interface. Advantageously, an attribute representative of transparency is associated with each voxel of the bounding volume 33. The attribute representative of transparency comprises two distinct states, namely the transparent state and the opaque state. The opaque state is advantageously associated with each of the voxels of the bounding volume after the discretisation into voxels of the bounding volume.

The surfaces 31 and 32 are respectively representative of the depth maps 101 and 102 in world space, the depth maps 101 and 102 comprising information on depth in the image plane. By world space is understood the reference of the scene captured by the acquisition devices and represented by the images 11 and 12, which correspond to a plurality of 2D views of a 3D scene. The generation of a surface 31 or 32 in the world space from a depth map 101 or 102 as represented in the image space is based on intrinsic and extrinsic parameters of acquisition devices that were used to capture the images 11 or 12 representing the scene that we seek to model.

FIGS. 4, 5, 6 and 9 illustrate the steps of a method for modelling the scene represented by the plurality of images 11, 12, according to a particular and non-restrictive embodiment of the invention.

FIG. 4 illustrates a first step of the method for modelling the scene based on the depth maps 101 and 102 associated with the images 11 and 12 representing the captured scene. In FIG. 4 we find the bounding volume 33, which surrounds surfaces 31 and 32, surface 31 being representative of the depth map 101 associated with image 11 and surface 32 being representative of the depth map 102 associated with image 12. A first view cone 41 shown in solid line is defined, the first view cone 41 corresponding to what is seen from a first viewpoint 410 corresponding to the viewpoint from which the image 11 was captured. The first view cone 41 is consequently associated with the surface 31 representative of the depth map 101. A second view cone 42 shown in dotted line is defined, the second view cone 42 corresponding to what is seen from a second viewpoint 420 corresponding to the viewpoint from which the image 12 was captured. The second view cone 42 is consequently associated with the surface 32 representative of the depth map 102. Once the view cones 41, 42 are defined, the intersection between these view cones 41, 42 on the one hand and the bounding volume 33 on the other hand is determined. This intersection, which corresponds to a volume, is illustrated by an area 43 in gray on FIG. 4. In other words, the volume of intersection 43 corresponds to the union of view cones 41, 42 inside the bounding volume 33. From the intersection volume 43, we determine the voxels belonging to the bounding volume 33 but not to the intersection volume 43. By voxels of the bounding volume 33 not belonging to the intersection volume 43 is understood those voxels whose centre, defined for example by its x, y, and z coordinates, does not belong to the intersection volume 43. This plurality of voxels not belonging to the intersection volume 43 is represented by a blank area 430 corresponding to a volume inside the bounding volume 33. Advantageously, the attribute representative of transparency associated with each of the voxels of the area 430 is modified and each voxel of the area 430 passes to the transparent state, the voxels belonging to the intersection volume 43 remaining in their initial state, that is to say in the opaque state as defined with respect to FIG. 3.

FIG. 5 illustrates a second step of the method for modelling the scene based on the depth maps 101, 102 associated with the images 11, 12 representing the captured scene. During this second step, the first view cone 41 associated with the surface 31 representative of the depth map 101 is selected. A plurality of rays is launched inside the first view cone 41, the launched rays originating from the first viewpoint 410. Advantageously, the rays launched from the first viewpoint 410 have as an end point the intersection with the surface 31. The intersection with the surface 31 corresponds advantageously to a voxel, a series of voxels being associated with the surface 31 according to a criterion of proximity of the voxels in relation to the surface 31. The proximity of the voxels to the surface 31 is advantageously estimated by measuring the distance between an element of the surface 31 and the centre of the voxels surrounding this element. The selection of voxels associated with the surface 31 is advantageously performed using a method of filling by diffusion, for example the method called "scan-line fill", the method called "seed fill" or the method called "flood fill". Running through each of the launched rays, we determine the voxels of the bounding volume 33 having an intersection with these rays. The attribute representative of transparency associated with these voxels having an intersection with the launched rays (initialised in opaque state) is modified and each of these voxels passes to the transparent state. This means that the attributes representative of transparency associated with the voxels of the bounding volume are thus determined according to the result of the intersection estimate between the voxels and launched rays. The voxels having an intersection with these launched rays and whose state passes to transparent belong to the areas 431 and 432 showing as hatched in FIG. 5.

According to a variant, the rays launched from the first viewpoint 410 have as an end point the second intersection with the bounding volume 33, that is to say, the intersection with the face of the bounding volume farthest from the first viewpoint. For each ray launched and for each voxel belonging to one of these rays, the distance between the origin (that is to say the first viewpoint 410) and the voxel considered is determined and compared to the distance separating the origin of the intersection point between the surface 31 and the ray considered. If the distance to the voxel is less than the distance to the surface 31, then the voxel passes to the transparent state. In the contrary case, if the distance to the voxel is greater than the distance to the surface 31, then the voxel remains in the opaque state. According to this variant the same voxels pass to the transparent state and belong to the areas 431 and 432 illustrated as hatched in FIG. 5. This second step is used to define the geometrically inconsistent voxels according to the first viewpoint 410, that is to say the voxels that do not belong to an object of the scene represented by image 11 associated with the first viewpoint 410.

FIG. 6 illustrates a third step of the method for modelling the scene based on the depth maps 101, 102 associated with the images 11, 12 representing the captured scene. The third step is similar to the second step illustrated with respect to FIG. 5, the difference being that it is applied to the second view cone 42. During this third step, the second view cone 42 associated with the surface 32 representative of the depth map 102 is selected. A plurality of rays is launched inside the second view cone 42, the launched rays originating from the second viewpoint 420. Advantageously, the rays launched from the second viewpoint 420 have as an end point the intersection with the surface 32. Running through each of the launched rays, we determine the voxels of the bounding volume 33 having an intersection with these rays. The attribute representative of transparency associated with these voxels having an intersection with the launched rays (initialised in opaque state) is modified and each of these voxels passes to the transparent state. The voxels having an intersection with these launched rays and whose state passes to the transparent state belong to the areas 433 and 434 which appear as hatched in FIG. 6. According to a variant, the rays launched from the second viewpoint 420 have as an end point the second intersection with the bounding volume 33, that is to say, the intersection with the face of the bounding volume farthest from the second viewpoint 420. For each ray launched and for each voxel belonging to one of these rays, the distance between the origin (that is to say the second viewpoint 420) and the voxel considered is determined and compared to the distance separating the origin of the intersection point between the surface 32 and the ray considered. If the distance to the voxel is less than the distance to the surface 32, then the voxel passes to the transparent state. In the contrary case, if the distance to the voxel is greater than the distance to the surface 32, then the voxel remains in the opaque state. According to this variant the same voxels pass to the transparent state and belong to the areas 433 and 434 illustrated as hatched in FIG. 5. This second step is used to define the geometrically inconsistent voxels according to the second viewpoint 420, that is to say the voxels that do not belong to an object of the scene represented by the image 12 associated with the second viewpoint 420. The voxels whose attribute representative of transparency has passed to the transparent state during the second step are illustrated in white (in the areas 431, 432) with respect to FIG. 6.

FIG. 9 illustrates a fourth step of the method for modelling the scene to generate a surface 90 resulting from the processing performed on the surfaces 31 and 32 of the bounding volume 33 according to the first, second, and third steps of the method illustrated with respect to FIGS. 4, 5 and 6. After the first, second and third steps previously described, the attribute representative of transparency associated with each voxel of the bounding volume 33 is either in the transparent state (geometrically inconsistent voxel, that is to say not belonging to an object of the scene to be modelled according to at least one of the capture viewpoints 410, 420 of images 11, 12 representative of the scene to be modelled), or in the opaque state (geometrically consistent voxel, that is to say a voxel belonging to an object in the scene to be modelled according to any capture viewpoint 410, 420 of images 11 and 12 representative of the scene to be modelled). During this fourth step, a surface 90 resulting from the fusion of surfaces 31 and 32 is generated. This surface 90 is advantageously generated according to the attributes representative of transparency associated with the voxels of the bounding volume. The surface 90 is obtained by determining the border between the voxels in the transparent state and the voxels in the opaque state. This surface 90 advantageously corresponds to the exterior envelope of the scene to be modelled from the images 11, 12 representing it. In other words, the surface 90 corresponds to the set of points or elements visible from any viewpoint and corresponds in this regard to the fusion of the surfaces 31, 32 representative of points/elements visible from a particular viewpoint (respectively 410, 420).

FIG. 7 diagrammatically shows an example of material embodiment of a processing unit 7 adapted to the modelling of a 3D scene from data representative of depth and to the generation of display signals of one or more images, according to an example of a particular and non-restrictive implementation of the invention. Unit 7 corresponds for example to a personal computer PC, a laptop or a games console.

The unit 7 comprises the following elements, connected to each other by an address and data bus 75 that also transports a clock signal:
 a microprocessor 71 (or CPU);
 a graphics card 72 comprising:
  several Graphics Processing Units 720 (or GPUs),
  a Graphical Random Access Memory (GRAM) 721;
 a non-volatile memory of ROM type (Read Only Memory) 76;
 a Random Access Memory (RAM) 77;
 one or more I/O (Input/Output) devices 74 such as for example a keyboard, a mouse, a webcam, and
 a power supply 78.

The device 7 also comprises a display device 73 of display screen type directly connected to the graphics card 72 to display notably the synthesised images calculated and composed in the graphics card, for example live. The use of a dedicated bus to connect the display device 73 to the graphics card 72 offers the advantage of having much greater data transmission bitrates and thus reducing the latency time for the display of images composed by the graphics card. According to a variant, a display apparatus is external to the device 6 and is connected to the device 7 by a cable transmitting the display signals. The device 7, for example the graphics card 72, comprises a means for transmission or connector (not shown in FIG. 7) adapted to transmit a display signal to an external display means such as for example an LCD or plasma screen or a video-projector.

It is noted that the word "register" used in the description of memories 72, 76 and 77 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 71 loads and executes the instructions of the program contained in the RAM 77.

The random access memory 77 notably comprises:
 in a register 770, the operating program of the microprocessor 71 responsible for switching on the device 7,
 calibration parameters 771 representative of the intrinsic and extrinsic parameters of the acquisition device(s) used to capture images representative of the scene to be modelled;
 the data 772 representative of images representing the captured scene (e.g. RGB data) and representative of depth associated with the captured images (e.g. corresponding to a depth map or to a disparity map);
 parameters of discretisation 773 used for the bounding volume discretisation (e.g. the number of voxels per volume unit; the number of voxels according to one, two or three dimensions x, y, z; the dimensions in x, y and z of a voxel).

The algorithms implementing the steps of the method specific to the invention and described hereafter are stored in the memory GRAM 721 of the graphics card 72 associated with the unit 7 implementing these steps. When switched on and once the data 772 is loaded into the RAM 77, the graphics processors 720 of the graphics card 72 load these parameters into the GRAM 721 and execute the instructions of these algorithms in the form of "shader" type microprograms using for example HLSL (High Level Shader Language) or GLSL (OpenGL Shading Language).

The random access memory GRAM 721 notably comprises:
 in a register 7210, the data representative of images representing the captured scene and the data representative of depth associated with the captured images;
 data 7211 representative of surfaces representative of depth data associated with the images (e.g. the coordinates of points/elements of a surface in world space);
 data 7212 representative of voxels (for example the position of the voxel in the bounding volume, the coordinates of the voxel centre, etc.);
 information 7213 representative of attributes representative of transparency associated with voxels (e.g. in the transparent state or the opaque state), and data 7214 representative of the surface resulting from the fusion of surfaces representative of the depth data (e.g. coordinates of the points/elements of the resulting surface in world space).

According to a variant, a part of the RAM 77 is assigned by the CPU 71 for storage of the values 7211 to 7214 if the memory storage space available in GRAM 721 is insufficient. This variant however causes greater latency time in the composition of an image comprising a representation of the environment 1 composed from microprograms contained in the GPUs as the data must be transmitted from the graphics card to the random access memory 77 passing via the bus 75 for which the transmission capacities are generally inferior to those available in the graphics card for transmission of data from the GPUs to the GRAM and vice-versa.

According to another variant, the power supply 78 is external to the device 4.

FIG. 8 illustrates a method for modelling a scene from maps representative of depth associated with images representative of the scene to be modelled, implemented in a processing unit 7, according to an example of non-restrictive implementation of the invention.

During an initialisation step 80, the different parameters of the unit 7 are updated. In particular, the data representative of images and associated maps representative of depth are initialised in any way.

Then, during a step 81, for each map representative of depth associated with an image representative of the scene to be modelled (among the plurality of images representing the scene to be modelled according to different viewpoints), a surface representative of the depth map considered. The representative surface is calculated in world space from the depth information expressed in the image space and stored in the depth map concerned. Conversion of depth data from the image space to world space is obtained from the transformation arrays by taking into account the calibration parameters (intrinsic parameters and/or extrinsic parameters) of the acquisition device(s) used to capture images representative of the scene to be modelled. Each depth map is thus transformed into a surface represented by a set of geometrical coordinates in world space, the geometric coordinates being associated with any point of the surface if the surface is represented by points or geometric coordinates being associated with all elements (for example any mesh of a meshing) of the surface if the surface is represented by elements (the coordinates being associated with the vertices of the meshes of the meshing if the elements correspond to meshes).

Then, during a step 82, a volume is estimated to include all surfaces representative of depth maps associated with the plurality of images representative of the scene. Once the bounding volume is defined, it is discretised into a plurality of voxels from discretisation parameters predefined or adjusted by a user. The density of voxels per volume unit is advantageously selected according to the quality of the desired final display and according to the number of calculations which can be performed by the processing unit during a given time. The higher the number of voxels per volume unit, the higher the quality of the display (of the scene once modelled), but in exchange the volume of calculations required to obtain the display will be high and require high calculation power. If live constraints exist for the modelling of the scene, the discretisation parameters are advantageously selected to obtain the best compromise between the necessary quantity of calculations and the display quality. If the voxels have dimensions which are too high, quantisation defects appear at the surface resulting from the fusion of the surfaces representative of the depth maps.

Then, during a step 83, an attribute representative of transparency is associated with each voxel of the discretised bounding volume. The attribute representative of transparency advantageously takes two values, namely a first value corresponding to a transparent state of the associated voxel and a second value corresponding to an opaque state of the associated voxel. Advantageously, the second value of the attribute representative of transparency (corresponding to the opaque state) is associated with each voxel of the bounding volume after the discretisation of the bounding volume, this second value corresponding to the initialisation value associated with voxels during their generation. The value of the attribute associated with the voxels of the bounding volume is modified to change to the first value (corresponding to the transparent state) for voxels of the bounding volume corresponding to at least one of the following cases:

the voxels of the bounding volume which do not belong to the view cones formed from each viewpoint associated with the surfaces representative of depth maps;

the voxels of the bounding volume located between the viewpoint associated with a surface and the surface considered, for each surface representative of a depth map;

Finally, during a step 84, a surface resulting from the fusion of surfaces representative of a depth map is generated according to the attributes representative of transparency associated with the voxels of the bounding volume. The resulting surface advantageously corresponds to the border formed between on the one hand the voxels whose associated transparency attribute takes the first value (voxels in a transparent state), and on the other hand the voxels whose associated transparency attribute takes the second value (voxels in the opaque state).

Naturally, the invention is not limited to the embodiments previously described.

In particular, the invention is not limited to a method of scene modelling but also extends to any device implementing this method and notably all devices comprising at least one GPU. The implementation of calculations necessary for modelling the scene is not restricted to an implementation in shader type microprograms but also extends to an implementation in any program type, for example programs that can be executed by a CPU type microprocessor.

According to an advantageous variant of the invention, depth information (for example a depth map or a disparity map) is transmitted to a remote unit (for example a receiver/decoder (or "set-top box"), a mobile phone, tablet, etc.) by any means of wired or wireless transmission (e.g. using a 3G or 4G type interface, Wifi® and a corresponding transmission channel). The depth information is advantageously obtained from the resulting surface generated from the surfaces representative of depth maps associated with the images representing the modelled scene, by converting the coordinates of the resulting surface in the world space into a representation in the image space. Such a variant presents the advantage of optimising the use of the bandwidth by optimising the quantity of information circulating on the transmission channel. In fact, according to this variant, a single piece of depth information (e.g. a single depth map) is transmitted instead of the plurality of depth maps associated with the images of the input video stream. The depth map generated from the resulting surface comprises depth information necessary for the display of the modelled scene by eliminating the information redundancy contained in the different depth maps associated with the images of the input video stream corresponding to different viewpoints and comprising redundant scene information (the scene being captured from several different viewpoints).

The present invention can be used in video games applications for example, whether by programs that can be executed in a PC, laptop computer or in specialised games consoles producing and displaying images live. The processing unit 7 described with respect to FIG. 7 is advantageously equipped with interaction means such as a keyboard and/or joystick, other command modes such as for example vocal recognition also being possible.

The invention claimed is:

1. A method for modelling a scene from a plurality of maps representative of depth, each map representative of depth being associated with a view of the scene according to a viewpoint, said method comprising:
   generating, for each map representative of depth of said plurality, a surface representative of said map representative of depth in world space;
   determining a volume bounding the surfaces generated in said world space, said bounding volume being discretized into a plurality of voxels,
   associating an attribute representative of transparency with the voxels of the bounding volume;
   changing a value of the attribute representative of transparency to a transparent state for the voxels of the bounding volume not belonging to view cones formed from each viewpoint associated with said surfaces;
   associating an attribute representative of transparency with the voxels of the bounding volume;
   generating, for each surface, a plurality of rays originating from a viewpoint associated with said each surface and having as end point an intersection with said each surface;
   running through said plurality of generated rays, and changing the value of the attribute representative of transparency for the voxels of the bounding volume having an intersection with one of the generated rays; and
   generating data representative of a resulting surface according to the attributes representative of transparency associated with said voxels.

2. The method according to claim 1, further comprising, for each surface, associating voxels of the bounding volume with said each surface to define said each surface, according to a criterion of proximity of the voxels relative to said each surface, the end points of the generated rays corresponding to the voxels associated with said each surface.

3. The method according to claim 2, wherein said attribute representative of transparency comprises two states, a first state corresponding to the transparent state of the voxel associated with said attribute, a second state corresponding to an opaque state of the voxel associated with said attribute, a voxel being in the transparent state when said voxel has an intersection with a ray of said plurality of rays.

4. The method according to claim 1, wherein said attribute representative of transparency is determined according to a position of the voxel associated with said attribute with respect to a viewpoint and to the surface representative of a depth map associated with the viewpoint.

5. The method according to claim 4, wherein said attribute comprises two states, a first state corresponding to the transparent state of the voxel associated with said attribute, a second state corresponding to an opaque state of the voxel associated with said attribute, a voxel being in the transparent state when positioned between a viewpoint and the surface representative of the depth map associated with the viewpoint in said world space.

6. The method according to claim 4, wherein the position of the voxel is obtained by determining an intersection between said voxel and a ray launched from said viewpoint.

7. The method according to claim 1, wherein said surface representative of the depth map in the world space is generated using parameters representative of calibration associated with at least one camera used to capture the views of the scene associated with the plurality of depth maps.

8. The method according to claim 1, wherein the plurality of depth maps is obtained from a multi-view video stream.

9. The method according to claim 8, wherein the video stream is an MVD (Multiview Video plus Depth) stream.

10. The method according to claim 1, further comprising transmitting depth information representative of said resulting surface.

11. A device for processing data representative of a plurality of maps representative of depth, each map representative of depth being associated with a view of a scene according to a viewpoint, wherein the device comprises
   at least one processor configured for:
      generating, for each map representative of depth of said plurality, a surface representative of said map representative of depth in world space;
      determining a volume bounding all surfaces generated in said world space, the said bounding volume being discretized into a plurality of voxels,
      associating an attribute representative of transparency being associated with the voxels of the bounding volume;
      changing a value of the attribute representative of transparency to a transparent state for the voxels of the bounding volume not belonging to view cones formed from each viewpoint associated with said surfaces;
      generating, for each surface, a plurality of rays originating from the viewpoint associated with said each surface and having as an end point the intersection with said each surface;
      running through said plurality of generated rays, and changing the value of the attribute representative of transparency for the voxels of the bounding volume having an intersection with one of the generated rays; and
      generating data representative of a resulting surface according to the attributes representative of transparency associated with said voxels.

12. The device according to claim 11, wherein the at least one processor is a Graphics Processing Unit.

13. The device according to claim 11, wherein the at least one processor is further configured to, for each surface, associate voxels of the bounding volume with said generated surface to define said each surface, according to a criterion of proximity of the voxels relative to said each surface, the end points of the generated rays corresponding to the voxels associated with said each surface.

14. The device according to claim 11, wherein said attribute representative of transparency comprises two states, a first state corresponding to the transparent state of the voxel associated with said attribute, a second state corresponding to an opaque state of the voxel associated with said attribute, a voxel being in the transparent state when said voxel has an intersection with a ray of said plurality of rays.

15. The device according to claim 11, wherein said attribute representative of transparency is determined according to a position of the voxel associated with said attribute with respect to a viewpoint and to the surface representative of a depth map associated with the viewpoint.

16. The device according to claim 15, wherein said attribute comprises two states, a first state corresponding to the transparent state of the voxel associated with said attribute, a second state corresponding to an opaque state of the voxel associated with said attribute, a voxel being in the transparent state when positioned between a viewpoint and the surface representative of the depth map associated with the viewpoint in said world space.

17. The device according to claim 15, wherein the position of the voxel is obtained by determining an intersection between said voxel and a ray launched from said viewpoint.

18. The device according to claim 11, wherein said surface representative of the depth map in the world space is generated using parameters representative of calibration associated with at least one camera used to capture the views of the scene associated with the plurality of depth maps.

19. The device according to claim 11, wherein the plurality of depth maps is obtained from a multi-view video stream.

20. The device according to claim 19, wherein the video stream is an MVD (Multiview Video plus Depth) stream.

21. The device according to claim 11, wherein the at least one processor is further configured to transmit depth information representative of said resulting surface.

22. A method for modeling a scene from a plurality of maps representative of depth, each map representative of depth being associated with a view of the scene according to a viewpoint, said method comprising:

generating, for each map representative of depth of said plurality, a surface representative of said map representative of depth in world space;

determining a volume bounding surfaces generated in said world space, said bounding volume being discretized into a plurality of voxels, associating an attribute representative of transparency with the voxels of the bounding volume;

changing a value of the attribute representative of transparency to a transparent state for the voxels of the bounding volume not belonging to view cones formed from each viewpoint associated with said surfaces;

generating, for each surface, a plurality of rays originating from the viewpoint associated with said each surface and having as end point an intersection with said each surface;

running through said plurality of generated rays, and changing the value of the attribute representative of transparency for the voxels of the bounding volume having an intersection with one of the generated rays;

generating data representative of a resulting surface according to the attributes representative of transparency associated with said voxels; and displaying the modeled scene on a display device.

23. A device for processing data representative of a plurality of maps representative of depth, each map representative of depth being associated with a view of a scene according to a viewpoint, wherein the device comprises at least one processor configured for:

generating, for each map representative of depth of said plurality, a surface representative of said map representative of depth in world space;

determining a volume bounding all surfaces generated in said world space, the said bounding volume being discretized into a plurality of voxels, an attribute representative of transparency being associated with the voxels of the bounding volume;

changing a value of the attribute representative of transparency to a transparent state for the voxels of the bounding volume not belonging to view cones formed from each viewpoint associated with said surfaces;

generating, for each surface, a plurality of rays originating from a viewpoint associated with said each surface and having as an end point the intersection with said each surface;

running through said plurality of generated rays, and changing the value of the attribute representative of transparency for the voxels of the bounding volume having an intersection with one of the generated rays;

generating data representative of a resulting surface according to the attributes representative of transparency associated with said voxels; and displaying the scene on a display device.

* * * * *